United States Patent
Gaulin et al.

(10) Patent No.: US 12,172,255 B2
(45) Date of Patent: Dec. 24, 2024

(54) METHOD FOR MACHINING A METAL PANEL USING AN AUTOMATED MECHANICAL MACHINING SYSTEM

(71) Applicant: AIRBUS ATLANTIC, Rochefort (FR)

(72) Inventors: Nicolas Gaulin, Le Perrier (FR); Yoann Aubert, Saint Brevin les Pins (FR); Giovanni Gerard, Saint Anne sur Brivet (FR); David Rivalland, Pontchateau (FR); Gwénolé Le Moal, Rezé (FR)

(73) Assignee: STELIA AEROSPACE, Rochefort (FR)

( * ) Notice: Subject to any disclaimer, the term of this patent is extended or adjusted under 35 U.S.C. 154(b) by 346 days.

(21) Appl. No.: 17/620,305

(22) PCT Filed: Jun. 22, 2020

(86) PCT No.: PCT/EP2020/067375
§ 371 (c)(1),
(2) Date: Dec. 17, 2021

(87) PCT Pub. No.: WO2020/260209
PCT Pub. Date: Dec. 30, 2020

(65) Prior Publication Data
US 2022/0241922 A1    Aug. 4, 2022

(30) Foreign Application Priority Data
Jun. 24, 2019   (FR) ...................................... 1906805

(51) Int. Cl.
*B23Q 15/14*   (2006.01)
*B23Q 15/12*   (2006.01)
(Continued)

(52) U.S. Cl.
CPC ............. *B23Q 15/14* (2013.01); *B23Q 15/12* (2013.01); *B23Q 17/20* (2013.01); *B23Q 17/2266* (2013.01)

(58) Field of Classification Search
CPC ........ B23Q 15/14; B23Q 15/12; B23Q 17/20; B23Q 17/2266; G05B 2219/49066; G05B 19/402
See application file for complete search history.

(56) References Cited

U.S. PATENT DOCUMENTS 4,208,156 A * 6/1980 Kralowetz ................ B23C 3/06
                                                        409/165
4,975,856 A * 12/1990 Vold ....................... B25J 9/1602
                                                        700/251
(Continued)

FOREIGN PATENT DOCUMENTS

CN    107344251 A      11/2017
CN    110434671 B  *   4/2020
(Continued)

OTHER PUBLICATIONS

Radu, B., Octavian, B., Melania, T. and Gabriel, R., 2012. Researches regarding the use of complex trajectories and two stages processing in single point incremental forming of two layers sheet. Circles, 91(17.35), pp. 128-170. (Year: 2012).*
(Continued)

*Primary Examiner* — Alicia M. Choi
(74) *Attorney, Agent, or Firm* — Alumen IP Law PC

(57) ABSTRACT

An automated mechanical machining system for machining a metal panel having a first face and a second face. The automated mechanical machining system further including at least one machining tool, at least one holding tool, a control module configured to control the at least one machining tool and the holding tool in a coordinated manner, a matching module configured to determine simple actual
(Continued)

machining paths TRAJr1 from, on the one hand, predetermined simple theoretical machining paths TRAJt1 and, on the other hand, measurement of the actual surface SURFr of the second face and a slope management module configured to determine sloping actual machining paths TRAJr2 from sloping theoretical machining paths TRAJt2, the simple theoretical machining paths TRAJt1 and the simple actual machining paths TRAJr1.

8 Claims, 3 Drawing Sheets

(51) Int. Cl.
    *B23Q 17/20*     (2006.01)
    *B23Q 17/22*     (2006.01)

(56) References Cited

U.S. PATENT DOCUMENTS

| | | | |
|---|---|---|---|
| 6,025,851 A * | 2/2000 | Valdes | G06T 11/203 345/442 |
| 2006/0039765 A1 | 2/2006 | Hamann | |
| 2009/0112410 A1 * | 4/2009 | Shull | B25J 9/1664 701/50 |
| 2009/0237749 A1 * | 9/2009 | Clouse | G05B 19/19 358/474 |
| 2017/0153120 A1 * | 6/2017 | Aymeric | G01C 23/005 |
| 2017/0205779 A1 * | 7/2017 | Murakawa | B23H 7/20 |
| 2019/0366446 A1 * | 12/2019 | Welsh | B23B 3/065 |

FOREIGN PATENT DOCUMENTS

| | | |
|---|---|---|
| FR | 2861325 A1 | 4/2005 |
| JP | 3441886 B2 * | 9/2003 |
| KR | 20190045210 A * | 5/2019 |

OTHER PUBLICATIONS

Search Report from the French Intellectual Property Office on corresponding FR application (FR1906805) dated Mar. 2, 2020.
International Search Report and Written Opinion on corresponding PCT application (PCT/EP2020/067375) from International Searching Authority (EPO) dated Aug. 25, 2020.

* cited by examiner

METHOD FOR MACHINING A METAL PANEL USING AN AUTOMATED MECHANICAL MACHINING SYSTEM

TECHNICAL FIELD

The present invention relates to the field of machining metal panels and is more particularly directed to a method for machining a curved metal panel. Although the present invention can be used in many fields, it finds particular application in aeronautics where machining of such metal panels makes it possible to produce structural parts of an aircraft such as a part of the fuselage.

In a known manner, the mass criterion is predominant in making structural parts of an aircraft, in order to reduce their energy consumption and the quantity of fuel carried on board. In order to be light and strong, a structural part thus comprises alternating zones of low thickness and zones of high thickness.

To form such a structural part, a chemical machining method, by electrical discharge machining, in which the panel portion with constant thickness to be machined is dipped into electrolytic solution baths is known from prior art. Such a method is time-consuming, requires chemicals and does not allow precise machining. It is therefore not suitable for generic, repeatable mass production. The use of chemicals is restrictive as it requires specific authorizations and skills. In addition, the use of chemicals is polluting.

A mechanical automated machining system for machining a metal panel is also known from prior art by patent application FR2861325A1. With reference to FIGS. 1 and 2, a metal panel P comprises a first face F1 and a second face F2 which is opposite to the first face F2. The mechanical machining system 100 comprises a machining tool 101 configured to tear or remove material from the first face F1, referred to as the machining face F1, and a holding tool 102, serving as a counter-bearing, configured to bear on the second face F2, referred to as the holding face F2. To enable machining, the machining tool 101 and the holding tool 102 are always aligned along a same machining and holding axis N2, which is normal to the second face F2, as illustrated in FIG. 1. When machining the first face F1, the machining tool 101 and the holding tool 102 are moved in a coordinated manner, in mirror image, to perform the desired machining.

As illustrated in FIG. 1, the machining tool 101 comprises a machining end adapted to contact the first face F1 of the panel P at a machining point 1P1. Analogously, the holding tool 102 comprises a holding end adapted to contact the second face F2 of the panel P at a holding point P2. During machining, the machining point P1 and the holding point P2 belong to the normal N2 of the second face F2 so that the holding tool 2 opposes, at the holding point P2, the bearing force of the machining tool 1 at the machining point P1. During the movement of the machining tool 101 and the holding tool 102, the machining point P1 and the holding point P2 are spaced apart by a distance d which is equal to the desired thickness of the panel P.

In practice, with reference to FIG. 2, the machining system 100 comprises a support module 104 for supporting the panel P in a vertical position so that the machining tool 1 and the holding tool 2 can access both faces F1, F2 of the panel P. The machining system 100 comprises a control module 105 configured to control position and orientation of the machining tool 101 and holding tool 102. As illustrated in FIG. 2, the mechanical machining system 100 comprises an adaptation module 106 configured to provide actual machining trajectories TRAJr to the control module 105 from, on the one hand, theoretical machining trajectories TRAJt, provided by a design module 107 and, on the other hand, a measurement of the actual surface area SURFr of the holding face F2 provided by a measurement module 108.

The theoretical machining trajectories TRAJt are defined for a theoretical surface area SURFt of the holding face F2 from the design module 107. Advantageously, the adaptation module 106 makes it possible to adapt the theoretical machining trajectories TRAJt to the actual surface area SURFr of the holding face F2. Such an adaptation module 106 implements geometric transformation steps, in particular morphing functions, in order to determine correspondence between the theoretical surface area SURFt and the actual surface area SURFr and to deduce a transformation of the theoretical machining trajectories TRAJt into actual machining trajectories TRAJr therefrom. In summary, the adaptation module 106 implements an adaptation function F of the theoretical machining trajectories TRAJt into actual machining trajectories TRAJr by taking account of the actual surface area SURFr. Such an adaptation function F is not defined analytically but is obtained by successive mathematical optimization steps according to the measurement of the actual surface area SURFr. Therefore, in practice, this adaptation function F is not accessible and cannot be easily adapted or modified.

With reference to FIG. 3, when machining a zone of low thickness Z1 adjacent to a zone of high thickness Z2 on the first face F1 of the panel P, it is known to perform several successive passes of the machining tool 101 so as to form steps ESC and thus simulate a slope. Given that the machining tool 101 and the holding tool 102 are aligned along a same normal axis N2 and are moved in mirror image, the formation of such stairs ESC cannot be avoided. In practice, the adaptation module 106 is only configured to transform simple theoretical machining trajectories TRAJt, in particular, into steps. The adaptation module 106 is not configured to transform theoretical sloping machining trajectories TRAJt.

Such stairs ESC are likely to create flaws at surface discontinuities and require a manual grinding step that increases machining time as well as cost.

In order to eliminate these drawbacks, the solution is to use a machining tool with a very small diameter in order to form substantially continuous steps with small dimensions. However, such a solution requires a very large number of passes and cannot be retained.

There is therefore a need for a method for machining metal panels that allows continuous slopes to be made in an automated manner.

Document CN107344251A relates to a traditional mechanical mirror machining system in which each tool is orientable.

SUMMARY

To this end, the invention relates to an automated mechanical machining system for machining a metal panel comprising a first face and a second face, which is opposite to the first face, the automated mechanical machining system comprising:
- at least one machining tool configured to contact the first face of the panel at a machining point,
- at least one holding tool configured to contact the second face of the panel at a holding point,
- a control module configured to control the machining tool and the holding tool in a coordinated manner, based on machining trajectories, so that the machining point is aligned with the holding point along the normal to the second face at said holding point, an adaptation module configured to determine simple actual machining trajectories TRAJr1 from, on the one hand, predetermined simple theoretical machining trajectories TRAJt1, and, on the other hand, a measurement of the actual surface area SURFr of the second face.

The invention is remarkable in that the automated mechanical machining system for machining a metal panel comprises a slope management module configured to determine actual sloping machining trajectories TRAJr2 from predetermined theoretical sloping machining trajectories TRAJt2, predetermined simple theoretical machining trajectories TRAJt1 and simple actual machining trajectories TRAJr1.

Advantageously, by means of the invention, the adaptation module is taken to advantage in order to determine the actual sloping machining trajectories TRAJr2 without modifying the adaptation module which is efficient but unsuitable for receiving sloping machining trajectories. The slope management module advantageously has a simple structure in comparison with the adaptation module which is complex.

Preferably, the slope management module is configured to determine actual sloping machining trajectories TRAJr2 without directly using the measurement of the actual surface area SURFr of the second face. Indeed, the measurement of the actual surface area SURFr of the second face is only taken into account indirectly in the simple actual machining trajectories TRAJr1. Such an approach makes it possible to reduce computation time and to accelerate the machining step.

Preferably, the slope management module comprises:

a sub-module for determining an elementary adaptation function from the predetermined simple theoretical machining trajectories TRAJt1 and the simple actual machining trajectories TRAJr1;

a sub-module for transforming predetermined theoretical sloping machining trajectories TRAJt2 by the elementary adaptation function in order to obtain the actual sloping machining trajectories TRAJr2.

The elementary adaptation function is determined rapidly with a reduced computational cost in comparison with the adaptation module.

Preferably, the determination sub-module is configured to determine the primitive of the elementary adaptation function from the predetermined simple theoretical machining trajectories TRAJt1 and the simple actual machining trajectories TRAJr1.

Preferably, the control module is configured to orient the holding tool along the normal to the second face at said holding point and configured to orient the machining tool along a machining axis that is spaced apart from the normal to the second face by a tilt angle that is greater than 3°, preferably greater than 5°. Advantageously, the actual sloping machining trajectories TRAJr2 allow modification of the orientation of the machining tool which is then misaligned from the holding tool while remaining in opposition.

According to one aspect of the invention, the tilt angle is greater than 3°, preferably greater than 5°. Preferably, the control module is configured to orient the machining tool along a machining axis that is spaced apart from the normal to the second face by a tilt angle that is between 0° and 45°.

The invention relates to a method for machining a metal panel by an automated mechanical machining system as set forth above, which method comprises:

a step of measuring the actual surface area SURFr of the second face a step of determining simple actual machining trajectories TRAJr1 from, on the one hand, predetermined simple theoretical machining trajectories TRAJt1 and, on the other hand, the measurement of the actual surface area SURFr of the second face a step of determining actual sloping machining trajectories TRAJr2 from predetermined theoretical sloping machining trajectories TRAJt2, predetermined simple theoretical machining trajectories TRAJt1 and simple actual machining trajectories TRAJr1 a step of controlling the machining tool and the holding tool in a coordinated manner, from actual sloping machining trajectories TRAJr2, the machining point being aligned with the holding point along the normal to the second face at said holding point.

Preferably, during the step of controlling the machining tool and the holding tool in a coordinated manner, the holding tool is oriented along the normal to the second face at said holding point and the machining tool is oriented along a machining axis that is spaced apart from the normal to the second face by a tilt angle that is greater than 3°.

The invention also relates to a method for machining a metal panel by an automated mechanical machining system comprising at least one machining tool configured to contact the first face of the panel at a machining point, at least one holding tool configured to contact the second face of the panel at a holding point, and a control module configured to control the machining tool and the holding tool in a coordinated manner, based on machining trajectories, such that the machining point is aligned with the holding point along the normal to the second face at said holding point, the method comprises a step of controlling the machining tool and the holding tool in a coordinated manner, during which the machining point is aligned with the holding point along the normal to the second face at said holding point.

The invention is remarkable in that, during the step of controlling the machining tool and the holding tool, the control module orients the holding tool along the normal to the second face at said holding point and orients the machining tool along a machining axis which is spaced apart from the normal to the second face by a tilt angle which is greater than 3°.

Preferably, the tilt angle varies between 0° and 45° and is gradually increased, depending on the machining configurations, from 0°.

BRIEF DESCRIPTION OF THE DRAWINGS

The invention will be better understood upon reading the following description, which is given solely by way of example, and referring to the appended drawings given by way of non-limiting examples, in which identical references are given to similar objects and in which.

It should be noted that the figures set out the invention in detail for implementing the invention, said figures can of course be used to better define the invention if necessary.

DETAILED DESCRIPTION

Figure 4:
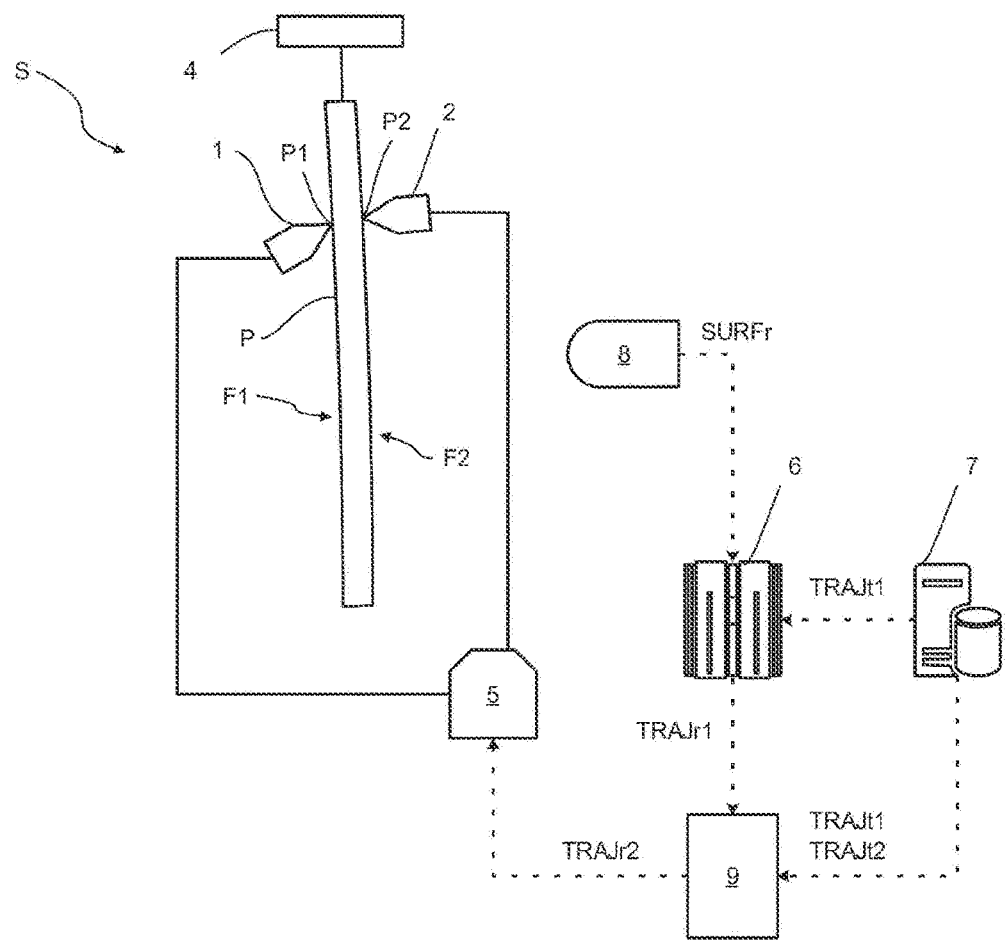
FIG. 4 is a schematic representation of a mechanical machining system according to the invention.

With reference to FIG. 4, there is shown a machining system S according to the invention for machining a metal panel P.

In this example, the panel P is metallic and preferably made of aluminum, aluminum-lithium, alloy (all grades, all series), or the like. The invention applies more particularly to a panel P with large dimensions, that is, having at least one of its dimensions greater than 1.5 meter.

Preferably, the panel P is curved as a result of a forming step performed beforehand, in particular by roll bending or transverse or longitudinal stretching. Its curved, or domed, shape prevents conventional machining by positioning the panel 1 on an anvil with complementary shape. As will be set forth later, the metal panel P is machined in a vertical position by using a movable counter-bearing which is moved in a coordinated manner.

Preferably, the panel P has a constant thickness, in particular between 2 mm and 15 mm. Such a panel P may also comprise thickened portions to strengthen it. During machining, through openings, concavities, referred to as pockets, as well as zones of high thickness and zones of low thickness are formed in the panel 1. The machining enables formation of a structural part with optimized mass.

Figure 1:
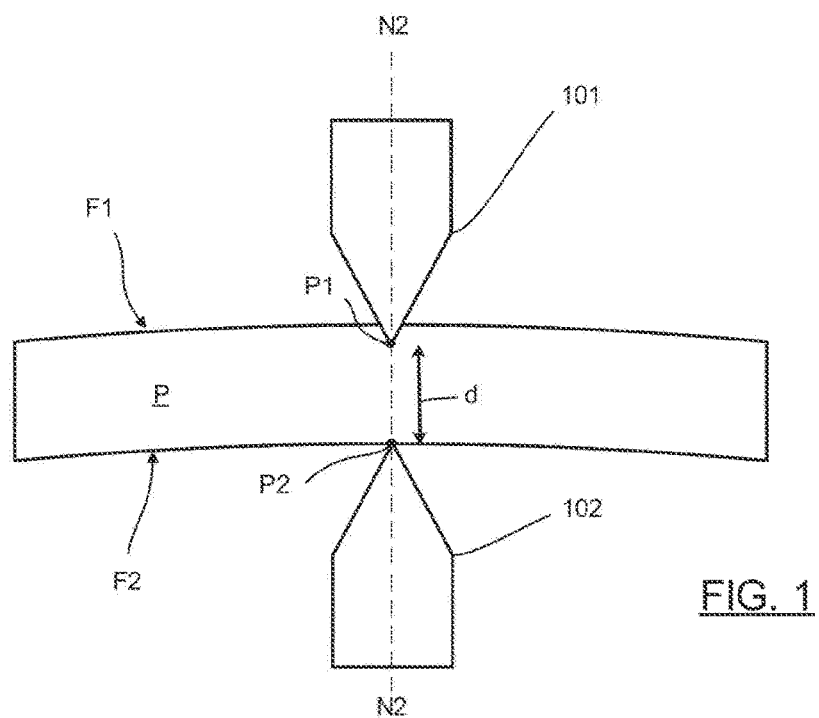
FIG. 1 is a schematic representation of a step of machining a metal panel according to prior art.
Figure 2:
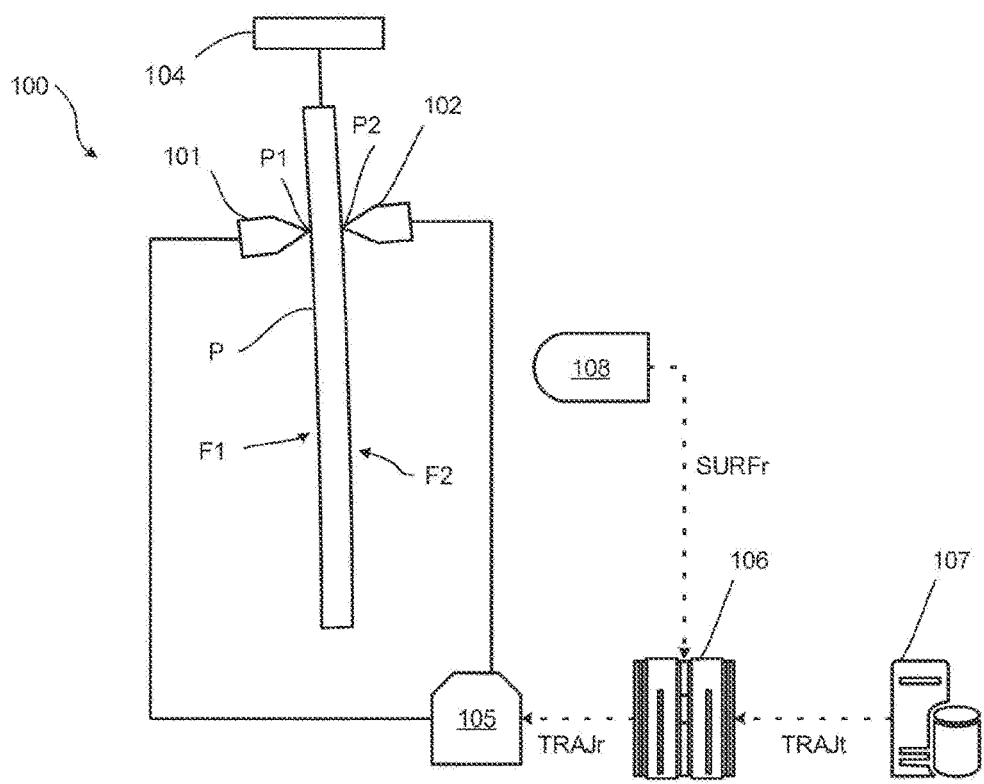
FIG. 2 is a schematic representation of a mechanical machining system according to prior art.
Figure 3:
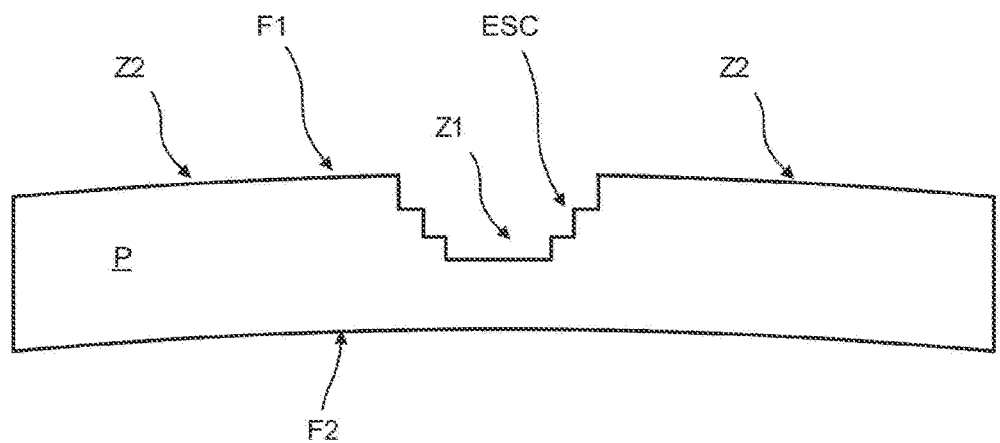
FIG. 3 is a schematic representation of a stair machining of a metal panel according to prior art.

With reference to FIG. 3, a metal panel P comprises a first face F1, referred to as the machining face F1, and a second face F2, referred to as the holding face F2, which is opposite to the first face F1. It goes without saying that the panel P can be machined along its two faces F1, F2. For the sake of clarity and brevity, only the machining of the first face F1 is set forth.

Still with reference to FIG. 3, analogously to the foregoing, the mechanical machining system S comprises a machining tool 1 configured to tear or remove material from the first face F1 and a holding tool 2, serving as a counter-bearing, configured to bear on the second face F2.

As illustrated in FIG. 3, the machining tool 1 comprises a machining end adapted to contact the first face F1 of the panel P at a machining point P1. Analogously, the holding tool 2 comprises a holding end adapted to contact the second face F2 of the panel P at a holding point P2. During machining, the machining point P1 and the holding point P2 belong to the normal N2 of the second face F2 so that the holding tool 2 opposes, at the holding point P2, the bearing force of the machining tool 1 at the machining point P1. Upon moving the machining tool 1 and the holding tool 2, the machining point P1 and the holding point P2 are spaced apart by a distance d which is equal to the desired thickness of the panel P.

In this example, each tool 1, 2 comprises an automated arm movable in six degrees of freedom (four translations and two rotations) but it goes without saying that the degrees of freedom could be different. The machining tool 1 comprises a machining end which could be of different kinds.

Analogously, the holding tool 1 comprises a holding end in the form of a sphere or cylinder, but of course it could be of a different shape.

The machining system 1 comprises a support module 4 for supporting the panel P in a vertical position so that the machining and holding tools 1 and 2 can access the two faces F1, F2 of the panel P. The support module 4 is preferably in the form of a vertical frame in which the panel P is mounted. Further preferably, the machining system S comprises means for cooling and discharging machining cutting (not represented), preferably means for injecting a water flow.

The machining system S further comprises a control module 5 configured to control position and orientation of the machining tool 1 and the holding tool 2. The control module 5 is configured to move, orient and activate the machining tool 1 and the holding tool 2 from actual machining trajectories TRAJr. The control module 5 is preferably in the form of a numerical control cabinet associated with automatons.

Such components are known from patent application FR2861325A1 and will not be set forth again for the sake of clarity and brevity.

As illustrated in FIG. 3, the mechanical machining system S also comprises an adaptation module 6 configured to provide simple actual machining trajectories TRAJr1 to the control module 5 from, on the one hand, predetermined simple theoretical machining trajectories TRAJt1, provided by a design module 7 and, on the other hand, a measurement of the actual surface area SURFr of the second face F2 provided by a measurement module 8.

The adaptation module 6 is in the form of a computer and a succession of applications for adapting the predetermined theoretical machining trajectories TRAJt1 to the actual surface area SURFr of the second face F2. As set forth previously, such an adaptation module 6 can only receive simple theoretical machining trajectories TRAJt1, in particular as stairs, and cannot receive theoretical sloping machining trajectories TRAJt2.

Such an adaptation module 6 implements geometric transformation steps, in particular morphing functions, in order to determine correspondence between the theoretical surface area SURFt and the actual surface area SURFr and to deduce a transformation of the simple theoretical machining trajectories TRAJt1 into simple actual machining trajectories TRAJr1 therefrom. In summary, the adaptation module 6 implements an adaptation function F of the simple theoretical machining trajectories TRAJt1 into simple actual machining trajectories TRAJr1. Such an adaptation function F is not defined analytically but is obtained by successive optimization steps according to the measurement of the actual surface area SURFr. As set forth previously, this adaptation function F is not accessible and cannot be adapted directly.

The design module 7 is preferably in the form of a computer and makes it possible to define theoretical machining trajectories TRAJt1, TRAJt2 by using a succession of computer-assisted design applications for a theoretical part whose theoretical surface area SURFt of the second face F2 is known.

In practice, the dimensions of the machined panel P are determined by the design module 7. In prior art, the dimensions were determined so as not to comprise an oblique slope given that they could not be interpreted by the adaptation module 6. In the present invention, the dimensions of the machined panel P are determined freely with fewer restrictions and it is possible to provide for oblique slopes. By oblique slope, it is meant a continuous variation in thickness.

Once the dimensions of the machined panel P are determined, the design module 7 makes it possible to provide predetermined theoretical sloping machining trajectories TRAJt2 corresponding to the determined dimensions of the machined panel P, but also predetermined simple theoretical machining trajectories TRAJt1 corresponding to the determined dimensions of the machined panel P. In other words, two types of trajectories TRAJt1, TRAJt2 are provided from a same definition of the machined panel P.

The measurement module 8 is configured to measure geometry of the second face F2 and is, for example, in the form of a three-dimensional scanner, so as to ensure precise positioning of the machining 1 and holding 2 tools.

Figure 5:
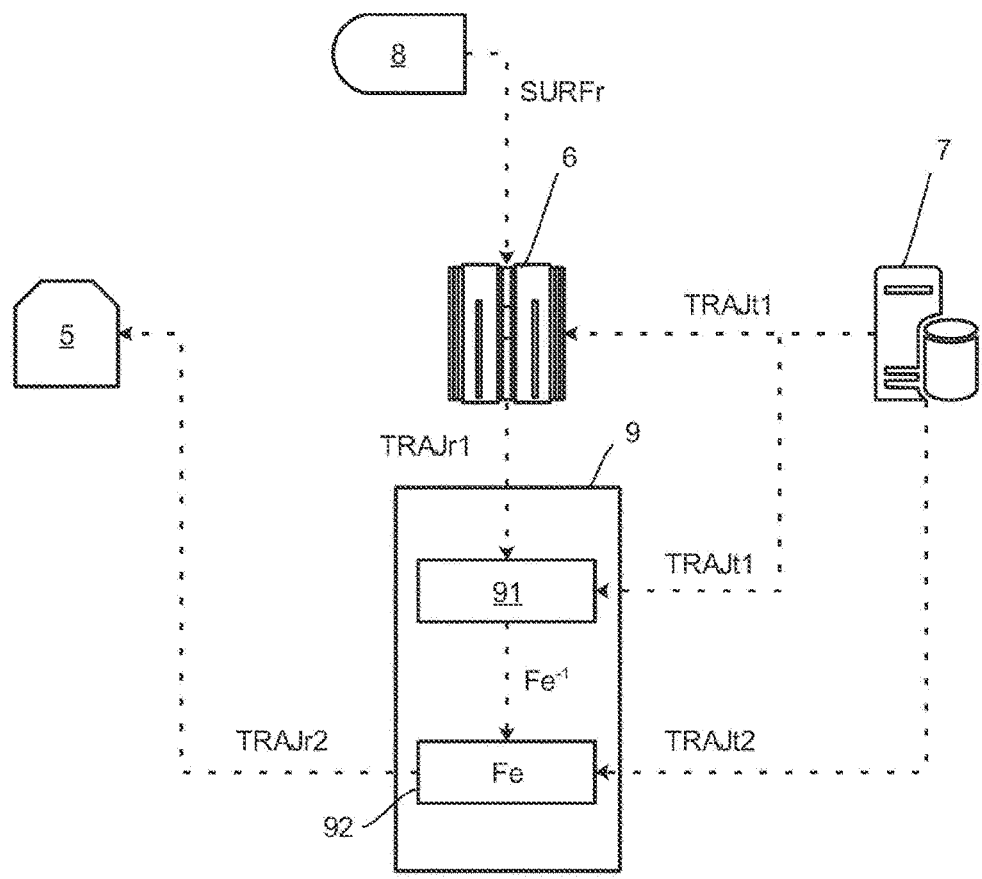
FIG. 5 is a schematic representation of steps of determining actual sloping machining trajectories according to the invention.

With reference to FIG. 5, according to the invention, the machining system S comprises a slope management module 9 which is preferably in the form of a calculator. The slope management module 9 is configured to determine actual sloping machining trajectories TRAJr2 from predetermined theoretical sloping machining trajectories TRAJt2, predetermined simple theoretical machining trajectories TRAJt1 and simple actual machining trajectories TRAJr1. This advantageously allows the bearing and the machining tool to be no longer coaxial.

Advantageously, the slope management module 9 makes it possible to provide actual sloping machining trajectories TRAJr2 to the control module 5 in order to achieve optimal machining comprising oblique slopes improving mechanical strength of the panel between zones of high thickness and zones of low thickness. Contrary to prior art, the slope management module 9 is used to provide the machining trajectories to the control module 5 and not the adaptation module 6.

Preferably, the slope management module 9 is configured to determine actual sloping machining trajectories TRAJr2 without using the measurement of the actual surface area SURFr of the second face F2. Thus, the slope management module 9 is not an improved adaptation module 6 but has a simpler structure relying on the robustness and suitability of the adaptation module 6 that has been developed and refined over time.

In this embodiment, the slope management module 9 comprises:
- a sub-module for determining 91 an elementary adaptation function Fe from the predetermined simple theoretical machining trajectories TRAJt1 and the simple actual machining trajectories TRAJr1; and
- a sub-module for transforming 92 predetermined theoretical sloping machining trajectories TRAJt2 by the elementary adaptation function Fe in order to obtain the actual sloping machining trajectories TRAJr2.

The elementary adaptation function Fe differs from the adaptation function implemented by the adaptation module 6 in that it is valid only for the actual surface area SURFr of the second face F2 of the panel P. Preferably, the determination sub-module 91 is configured to determine the primitive $Fe^{-1}$ of the elementary adaptation function Fe from the predetermined simple theoretical machining trajectories TRAJt1 and the simple actual machining trajectories TRAJr1. In other words, the elementary adaptation function Fe is deduced a posteriori following processing of the adaptation module 6 so as to take account of the geometric transformations determined for simple actual machining trajectories TRAJr1.

Figure 6:
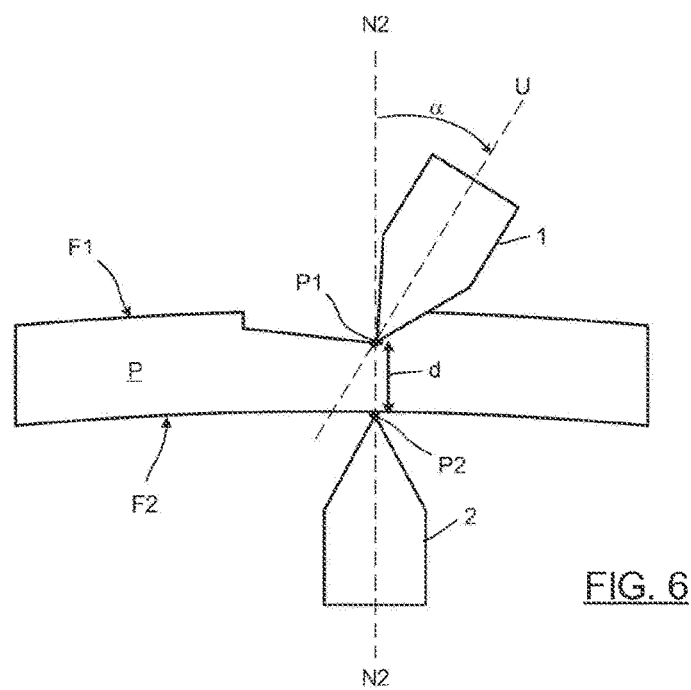
FIG. 6 is a schematic representation of a step of stair machining a metal panel according to the invention.

Advantageously, the transformation sub-module 92 applies the geometric transformations, calculated for simple trajectories, to the sloping trajectories. The actual sloping machining trajectories TRAJr2 allow the tools 1, 2 to be controlled in a coordinated manner while orienting the machining tool 1 along a machining axis U which is spaced apart from the normal N2 to the second face F2 by a tilt angle α which is greater than 3°, preferably 5° as illustrated in FIG. 6. Preferably, the tilt angle α is between 0° and 45°. The tilt angle varies gradually, depending on the machining configurations, from 0° to the target value. An inclination along a single plane has been illustrated, but of course the inclination could be made along 3 planes.

An exemplary implementation of a machining method according to the invention will be set forth with reference to FIG. 4.

The method comprises a step of measuring the actual surface area SURFr of the second face F2 by the measurement module 8.

Then, the method comprises a step of determining, by the adaptation module 6, simple actual machining trajectories TRAJr1 from, on the one hand, predetermined simple theoretical machining trajectories TRAJt1, and, on the other hand, the measurement of the actual surface area SURFr of the second face F2. In a known manner, the simple actual machining trajectories TRAJr1 are determined from a measurement of the theoretical surface area SURFt which is known to the adaptation module 6. Contrary to prior art, which transmitted the simple actual machining trajectories TRAJr1 to the control module 5, these are only used to determine the actual sloping machining trajectories TRAJr2.

In this example, the method comprises a step of determining actual sloping machining trajectories TRAJr2 from predetermined theoretical sloping machining trajectories TRAJt2, predetermined simple theoretical machining trajectories TRAJt1 and simple actual machining trajectories TRAJr1 by the slope management module 9.

Preferably, the method comprises a step of determining an elementary adaptation function Fe from the predetermined simple theoretical machining trajectories TRAJt1 and the simple actual machining trajectories TRAJr1 by the determination sub-module 91. Preferably, the determination sub-module 91 is configured to determine the primitive $Fe^{-1}$ of the elementary adaptation function Fe from the predetermined simple theoretical machining trajectories TRAJt1 and the simple actual machining trajectories TRAJr1. In this example, the primitive $Fe^{-1}$ is in the form of a matrix whose coefficients are determined by linear or non-linear optimization. The elementary function Fe is obtained by inversion of the primitive function $Fe^{-1}$.

The method comprises a step of determining the actual sloping machining trajectories TRAJr2 by the elementary adaptation function Fe of the transformation sub-module 92 from the predetermined theoretical sloping machining trajectories TRAJt2.

The method comprises a step of controlling the machining tool 1 and the holding tool 2 in a coordinated manner by the control module 5, from actual sloping machining trajectories TRAJr2. During the control step, the machining point P1 is aligned with the holding point P2 along the normal N2 to the second face F2 at said holding point P2 to form an optimal counter-bearing.

During the control step, the position of the holding point P2 is precisely moved on the second face F2. The position of the machining point P1 and the orientation of the machining tool 1 are defined by the actual sloping machining trajectories TRAJr2 in order to achieve optimal machining. In particular, for each holding point P2, a gap d and an orientation of the machining axis U are defined.

When a sloping zone is to be made, the control module 5 orients the holding tool 2 along the normal N2 to the second face F2 at said holding point P2 and orients the machining tool 1 along a machining axis U which is spaced apart from the normal N2 to the second face F2 by a tilt angle α. According to one aspect of the invention, the tilt angle α varies during the control step in order to form oblique slopes having suitable shapes.

In summary, the method according to the invention makes it possible to perform machining along any oblique slope using a machining tool 1 that can be misaligned with respect to the holding tool 2. The machining performed is moreover fast and precise, does not require manual finishing and makes it possible to provide a light final part with high mechanical strength.

The invention claimed is:

1. A method for machining a metal panel comprising a first face and a second face using an automated mechanical machining system comprising:
    at least one machining tool configured to contact the first face of the panel at a machining point;
    at least one holding tool configured to contact the second face of the panel at a holding point;
    a control module configured to control the at least one machining tool and the at least one holding tool in a coordinated manner, on the basis of machining trajectories, so that the machining point is aligned with the holding point along a normal to the second face at said holding point;
    an adaptation module configured to determine simple actual machining trajectories TRAJr1 from predetermined simple theoretical machining trajectories TRAJt1 and a measurement of actual surface area SURFr of the second face; and
    a slope management module configured to determine an actual sloping machining trajectories TRAJr2 from predetermined theoretical sloping machining trajectories TRAJt2, the predetermined simple theoretical machining trajectories TRAJt1, and the simple actual machining trajectories TRAJr1;
    the method comprising the steps:
    measuring the actual surface area SURFr of the second face; determining the simple actual machining trajectories TRAJr1 from at least one of the predetermined simple theoretical machining trajectories TRAJt1 and the measurement of the actual surface area SURFr of the second face;
    determining the actual sloping machining trajectories TRAJr2 from the predetermined theoretical sloping machining trajectories TRAJt2, the predetermined simple theoretical machining trajectories TRAJt1 and the simple actual machining trajectories TRAJr1; and
    controlling the at least one machining tool and the at least one holding tool in a coordinated manner, from the actual sloping machining trajectories TRAJr2, the machining point being aligned with the holding point along the normal to the second face at said holding point.

2. The method according to claim 1, further comprising determining the actual sloping machining trajectories TRAJr2 without directly using the measurement of the actual surface area SURFr of the second face.

3. The method according to claim 1, further comprising:
    determining an elementary adaptation function from the predetermined simple theoretical machining trajectories TRAJt1 and the simple actual machining trajectories TRAJr1; and
    transforming the predetermined theoretical sloping machining trajectories TRAJt2 by the elementary adaptation function in order to obtain the actual sloping machining trajectories TRAJr2.

4. The method according to claim 3, wherein a primitive of the elementary adaptation function is determined from the predetermined simple theoretical machining trajectories TRAJt1 and the simple actual machining trajectories TRAJr1.

5. The method according to claim 1, further comprising using the control module to orient the at least one holding tool along the normal to the second face at said holding point and orient the at least one machining tool along a machining axis which is spaced apart from the normal to the second face by a tilt angle which is greater than 3°.

6. The method according to claim 5, wherein the control module orients the at least one machining tool along a machining axis which is spaced apart from the normal to the second face by a tilt angle which is greater than 5°.

7. The method for machining a metal panel according to claim 1, wherein, during the step of controlling the at least one machining tool and the at least one holding tool in a coordinated manner, the at least one holding tool is oriented along the normal to the second face at said holding point and the at least one machining tool is oriented along a machining axis which is spaced apart from the normal to the second face by a tilt angle which is greater than 3°.

8. The method for machining a metal panel according to claim 7, wherein the tilt angle varies during the control step.

* * * * *